US006670967B2

(12) United States Patent
Mezei

(10) Patent No.: US 6,670,967 B2
(45) Date of Patent: Dec. 30, 2003

(54) METHOD OF EFFICIENTLY INCREASING READABILITY OF FRAMEMAKER GRAPHICAL USER INTERFACE

(75) Inventor: Bruce W. Mezei, Columbia, MD (US)

(73) Assignee: The United States of America as represented by the National Security Agency, Washington, DC (US)

( * ) Notice: Subject to any disclaimer, the term of this patent is extended or adjusted under 35 U.S.C. 154(b) by 487 days.

(21) Appl. No.: 09/795,071

(22) Filed: Feb. 26, 2001

(65) Prior Publication Data

US 2002/0158901 A1 Oct. 31, 2002

(51) Int. Cl.[7] ................................................. G09G 5/00
(52) U.S. Cl. ........................................................ 345/744
(58) Field of Search ................................. 345/751, 759, 345/744, 762, 707

(56) References Cited

U.S. PATENT DOCUMENTS

| | | |
|---|---|---|
| 5,267,331 A | 11/1993 | Siwoff |
| 5,731,805 A | 3/1998 | Tognazzini et al. |
| 5,874,965 A | 2/1999 | Takai et al. |
| 5,956,035 A | 9/1999 | Sciammarella et al. |
| 6,442,714 B1 * | 8/2002 | Griffin et al. .................. 714/46 |
| 6,449,627 B1 * | 9/2002 | Baer et al. .................... 707/514 |

* cited by examiner

*Primary Examiner*—Cao (Kevin) Nguyen
(74) *Attorney, Agent, or Firm*—Robert D. Morelli

(57) ABSTRACT

The present invention is a method of enhancing the readability of FrameMaker® for a visually-impaired user by determining whether or not a file named ".maker.large" exists in the user's $HOME directory. If ".maker.large" exists in the user's $HOME directory then setting an environmental variable $EZRIDER to a pathname $FMHOME/fdk/NSAapps.large of a directory containing enlarged EASYRIDER API client files. If ".maker.large" is not in the user's $HOME directory then setting the environmental variable $EZRIDER to the pathname $FMHOME/fdk/NSAapps of a directory containing unenlarged EASYRIDER client files. If the second step was performed then setting X Window Large Display Resources to RESOURCE_MANAGER property of a root window of screen 0 and determining whether or not an X resource "maker.api.preferences.autoApply" is set to true in $HOME/.Xdefaults. If "maker.api.preferences.autoApply" is set to true then turning on a notification for FrameMakert® to contact the user's Personal Preferences client; initializing the EASYRIDER API client files; and initializing FrameMaker® product dialogs.

8 Claims, 10 Drawing Sheets

| Cursor | File | Representation |
|---|---|---|
| reshape, crosshair | crosshair_large |  |
| | crosshair_largeMask |  |
| ibeam90 | Ibeam90_large |  |
| | Ibeam90_largeMask |  |
| ibeaml | IbeamLeft_large |  |
| | IbeamLeft_largeMask |  |
| ibeamr | IbeamRight_large |  |
| | IbeamRight_largeMask |  |

| Cursor | File | Representation |
|---|---|---|
| arrow, dialog | left_ptr_large |  |
|  | left_ptr_largeMask |  |
| move | move_large |  |
|  | move_largeMask |  |
| cellsresize | right_large |  |
|  | right_largeMask |  |
| rotate | rotobject_large |  |
|  | rotobject_largeMask |  |

| Cursor | File | Representation |
|---|---|---|
| textline | textline_large |  |
| | textline_largeMask |  |
| ibeam | xterm_large |  |
| | xterm_largeMask |  |

METHOD OF EFFICIENTLY INCREASING READABILITY OF FRAMEMAKER GRAPHICAL USER INTERFACE

FIELD OF THE INVENTION

The present invention relates to computer graphics processing, operator interface processing, and selective visual display systems and, more particularly, to image size control (i.e., enlargement).

BACKGROUND OF THE INVENTION

FrameMaker® from Adobe Systems, Inc. is a powerful desktop publishing software package. However, visually-impaired users have difficulty performing simple tasks in the UNIX version of FrameMaker® because the menus, window borders, dialog windows, toolbars, cursors, documents, on-line help manuals, and product documentation are displayed in sizes, colors, and formats that result in small displays, poor discriminability, low contrast, and few displayed commands which are difficult to read. FrameMaker® provides some capability for enhancing readability (e.g., manual magnification), but this capability is limited and often requires many manual steps where the commands are scattered over a large area, resulting in a reduction in efficiency of a visually-impaired user.

Visually-impaired users have requested improved readability in FrameMaker® to see text and execute commands in a manner that is no more burdensome then on a visually unimpaired user. Presently, large computer monitors are commercially available for providing magnification which will enhance readability, but such monitors are expensive. The present invention provides enhanced readability and efficiency of use in FrameMaker® on a standard computer monitor that is inexpensive as compared to a large computer monitor.

U.S. Pat. No. 5,267,331, entitled "DIGITALLY ENHANCED IMAGER FOR THE VISUALLY IMPAIRED," discloses a device for and method of creating high resolution, high contrast images of textual documents to enhance readability for the visually impaired. However, U.S. Pat. No. 5,267,331 does not disclose a method of enhancing readability of the FrameMaker® desktop publishing software package. U.S. Pat. No. 5,267,331 is hereby incorporated by reference into the specification of the present invention.

U.S. Pat. No. 5,731,805, entitled "METHOD AND APPARATUS FOR EYETRACK-DRIVEN TEXT ENLARGEMENT," discloses a device for and method of expanding information of interest to a use on a computer monitor. U.S. Pat. No. 5,731,805 requires a device for tracking the gaze of the user to determine the information of interest whereas the present invention does not. U.S. Pat. No. 5,731,805 is hereby incorporated by reference into the specification of the present invention.

U.S. Pat. No. 5,874,965, entitled "METHOD FOR MAGNIFYING A PLURALITY OF DISPLAY IMAGES TO REVEAL MORE DETAILED INFORMATION," discloses a method of displaying multiple images, where the data in the images are hierarchical in nature. The present invention does not require the images made more readable be hierarchical in nature. In addition, U.S. Pat. No. 5,874,965 does not disclose a method of making FrameMaker® more readable in an efficient manner as does the present invention. U.S. Pat. No. 5,874,965 is hereby incorporated by reference into the specification of the present invention.

U.S. Pat. No. 5,956,035, entitled "MENU SELECTION WITH MENU STEM AND SUBMENU SIZE ENLARGEMENT," discloses a method of increasing the size of a menu item, or sub-menu item, at which the user points. However, U.S. Pat. No. 5,956,035 does not disclose a method of enhancing the readability of FrameMaker® in an efficient manner as does the present invention. U.S. Pat. No. 5,956,035 is hereby incorporated by reference into the specification of the present invention.

SUMMARY OF THE INVENTION

An object of the present invention is enhancing the readability of FrameMaker® for a visually-impaired user.

Another object of the present invention is enhancing the readability of FrameMaker® for a visually-impaired user in a manner that is as efficient to a visually-impaired user as an unenhanced version of FrameMaker® is to a user whose vision is not impaired.

The present invention is a method of enhancing the readability of FrameMakert® by converting a relatively small display into one containing relatively large menus, large window borders, large cursors, and large dialog boxes.

The first step of the method is determining whether or not the file ".maker.large" exists in the user's $HOME directory.

If the file ".maker.large" is in $HOME then the second step is setting an environmental variable $EZRIDER to the pathname of the directory containing the enlarged EASYRIDER client files (i.e., $FMHOME/fdk/NSAapps.large).

If the file ".maker.large" is not in $HOME then the third step is setting the environmental variable $EZRIDER to the pathname of the directory containing the normal, not enlarged, EASYRIDER client files (i.e., $FMHOME/fdk/NSAapps).

If the second step was performed then the fourth step is setting the X Window Large Display Resources into RESOURCE_MANAGER property of the root window of screen 0.

After either the third step or the fourth step, the fifth step is determining whether or not the X resource "Maker-.api.preference.autoApply" is set to true in $HOME/.Xdefaults.

If the X resource "Maker.api.preferences.autoApply" is set to true then the sixth step is turning on the notification for FrameMaker® to contact Personal Preferences after the user opens any file.

The seventh step is initializing each EASYRIDER API client.

The eighth step is initializing FrameMaker® product dialogs.

The fourth step above is realized by setting the resources for the main product window to a button font to 25 point Helvetica bold, a width of 412 pixels, and a height of 84 pixels; setting the font resources for the document window status bar and menu bar to a font of 17 point Helvetica bold; setting the font resources for the document window pop-up menus to a font of 24 point Helvetica bold; setting the color resources for the document window so that the foreground and the background are complementary colors; setting the color resources of the document window scroll bars so that the background and the trough are complementary colors; setting the resource to make it easier to read colored text that is highlighted by setting slow highlighting to true; setting the font resource for the dialog boxes for scroll list items to 17 point Helvetica bold and all other items to 17 point Helvetica bold; setting the resources to make it easier to distinguish the "ON" setting from the "OFF" setting by selecting the color red for the "ON" setting; setting the color resources to make it easier to distinguish the "OFF" setting from the "AS IS" setting by making the top shadow and the bottom shadow complementary colors; setting the color resources in the main product window, the menus, the dialogs, and the document window scroll bars so that the foreground and the background are complementary colors; setting the resources for the Character Catalog and the Paragraph Catalog to a font of 20 point Helvetica bold, a width of 272 pixels, and a height of 336 pixels; setting the resources for the Book window to a font of 24 point Helvetica bold, a width of 600 pixels, and a height of 450 pixels; setting resources for the cursors to a textline of "textline_large", an arrow of "left_ptr_large", a reshape of "crosshair_large", a dialog of "left_ptr_large", an ibeam of "xterm_large", an ibeaml of "IbeamLeft_large", an ibeamr of "IbeamRight_large", an ibeam90 of "Ibeam90_large", a move of "move large", a rotate of "rotobject_large", a doreshape of "draft_large", a crosshair of "crosshair_large", and a cellresize of "right_large"; setting the resources for using alternate dialogs to a directory suffix of "_ck" and a name prefix of "fmck_"; setting size resources for the Large Tools window by setting the minimum and maximum height to 441 pixels and the minimum and maximum width to 430 pixels; setting the size resource for the Small Tool palette to a minimum height of 72 pixels; setting general resources for all file browsers in the dialog windows to a height and width of 200 pixels, a margin height and width of 0 pixels, and the top attachment, bottom attachment, left attachment, and right attachment to "XmATTACH_FORM"; setting the textbox resources for all file browsers in the dialog windows to an x and y of 0 pixels and a width of 294 pixels; setting the scrolllist resources for all of the file browsers in the dialog windows to an x of 2 pixels, a y of 30 pixels, a visible item count of 8, a width of 172 pixels, a bottom offset of 42 pixels, a top offset of 32 pixels, and a top attachment and a bottom attachment of "XmATTACH_FORM"; setting the resources for the current directory for all of the files in the dialog windows to an x of 0 pixels, a y of 158 pixels, a recompute size of false, a height of 20 pixels, a width of 192 pixels, a bottom offset of 20 pixels, and a left attachment, a right attachment, and a bottom attachment of "XmATTACHH_FORM"; and setting the resources of the file count for all of the file browsers in the dialog windows to an x of 0 pixels, a y of 174 pixels, a recompute size of false, a height of 19 pixels, a width of 192 pixels, and a bottom attachment of "XmATTACH_FORM."

The steps for realizing the seventh step above are determining whether or not the client uses resource files. If so then setting the environmental variable $FAPIDIR to $EZRIDER, where $EZRIDER is the current client's directory of normal sized or enlarged files, running the client executables, and opening the dialog resource files and button palettes residing in $FAPIDIR.If not then setting the environmental variable $FAPIDIR to $FMHOME/fdk/NSAapps, and running the client executables.

The steps for realizing the eighth step above are determining whether or not the large display option was chosen. If so then opening the x resource dialog files residing in $FMHOME/fininit/usenglish/xresources_ck using X Window Large Display Resources set in the fourth step above. If not then opening the X resource dialog files residing in $FMHOME/fminit/usenglish/xresources using default X Window Resources. Note that the present invention applies to any language. If another language is desired then the appropriate language file would be used in place of "usenglish."

The steps for establishing a user's personal preferences when using FrameMaker® include determining if a callback notification was received upon the opening of a document; determining if a callback notification was received upon either a menu command or a keyboard (KB) shortcut command; determining if a callback notification was received upon a hypertext message from the Toolbar. If it is determined that a callback notification was received then determining whether or not the suffix of the filename is ".hlp." If so then exiting. If not then determining if the file is a view only palette. If so then exiting. If not then opening the file "preferences" in the $HOME directory. If the last step was performed then do the following steps: reading the zoom percentages from ".preferences"; converting the zoom value to a real number; converting the real number to a metric number; dividing the metric number by 100; setting the zoom property to the result of the last step; reading the width of the document being worked on by the user from ".preferences"; converting the width value to an integer value; setting the width property to the result of the last step; reading the height of the document being worked on by the user from ".preferences"; converting the height value to an integer value; setting the height property to the result of the eighteenth step; and closing the ".preferences" file in the $HOME directory.

DETAILED DESCRIPTION

Figure 1:
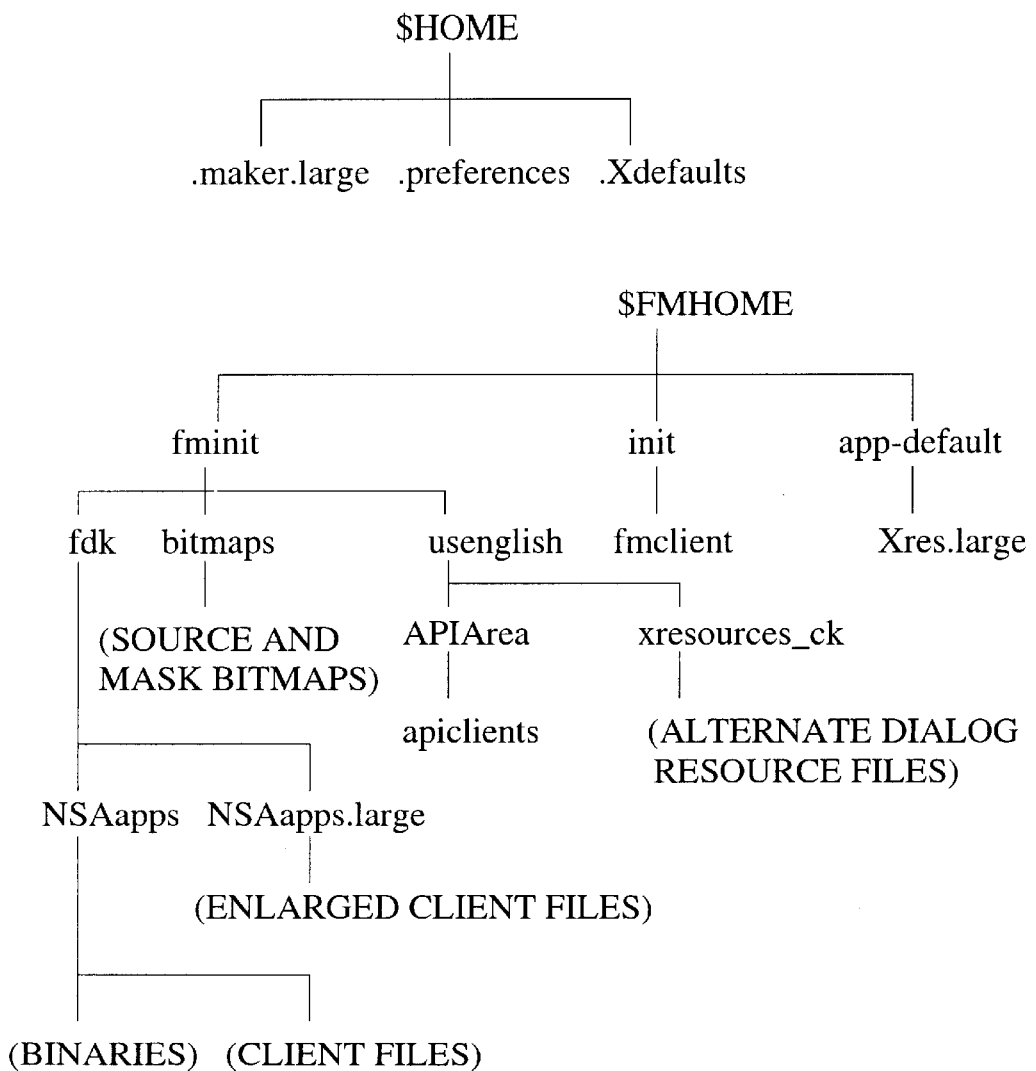
FIG. 1 is a chart of the directories and files used in the present invention.

The present invention is a method of enhancing the readability of FrameMaker® for a visually-impaired user in a manner that is as efficient to use as an unenhanced version of FrameMaker®. The present invention enhances a UNIX version of FrameMaker® with X Window System resources, cursor bitmasks, Application Programming Interface (API) clients, and button palettes. The present invention enhances a version of FrameMaker® that is further enhanced by the API clients of U.S. Pat. No. 6,070,175 (hereafter referred to as EASYRIDER), reworked to accommodate a 17 point font size. U.S. Pat. No. 6,070,175 is hereby incorporated by reference into the specification of the present invention.

EASYRIDER includes the following tools: API Client Manager, Add Rotated Pages, Copy Pages, Custom Right/Left Master Pages, Paragraph Format Usage Document Report, Hypertext Markers Document Report, /tmp Directory Warning, Created Table to Chart, Compare is Paragraph Formats Document Report, Global Hyphenation, Toolbar, Transfer Document to Server, File Manager, Personal Preferences, Chart It, Drop Shadow, EASY Sort, Sum Columns, Table Export, Table Transpose, Redline, Line Count Document Report, Paragraph Format Document Report, Page Count Book Report, CGM Import Client, UNIX Compression Import Filter, UNIX Compression Export Client, GZIP Compression Import Filter, GZIP Compression Export Client, DES Encryption Import Filter, and DES Encryption Export Client.

The API Client Manager provides an easy-to-use mechanism to manage API clients. A dialog box provides the full list of available clients (i.e. those registered in the $FMHOME registration file). User can click on button for client description and move clients between Enable and Disable lists. Manager automatically builds registration file in user's home directory. Prior version of registration file is backed-up.

Add Rotated Pages automatically adds a master page of a specified orientation (e.g. adds a landscape master page in a portrait document). Automatically creates the initial page layout (header, template for body page text frame, and footer) according to user's specifications. Optionally adds disconnected body pages using the new master page background.

Copy Pages automatically copies one, a range, or all body pages from one document to another or to itself. Handles copying a body page of different orientation (e.g. copying a landscape body page into a portrait document). Provides a rich set of options for applying master page background to the new body page in the destination document including automatically copying the master page from the source document. Text frame connections within the copied pages are retained. Optionally, the first paragraph of each flow is set to Start Top of Page and connections are made with frames of enclosing pages.

Custom Right/Left Master Pages provides the capability for body pages in a double-sided document to have multiple custom right and left master pages, with an updating mechanism similar to FrameMaker®'s default Right and Left. The client scans all body pages of the document, detects master page names with the prefix "Right" and "Left" or "right" and "left" (e.g. Right_Diagram and Left_Diagram), and applies the appropriate one depending on the body page being a right or left page. Master and body pages can be synchronized when the command is executed manually or automatically upon adding or deleting a page.

Paragraph Format Usage Document Report analyzes and reports on paragraph format usage. Upon analyzing the current document, the client creates a separate document with two tables: one for paragraph catalog formats and another for non-cataloged formats. A format that is not used in the document is highlighted in red (candidate for deletion). If a format is used, the type of page on which it is used is identified: body, master, reference, and hidden page. An option provides the capability to automatically remove all or a subset of unused formats from the document.

Hypertext Markers Document Report lists page number and marker text for each hypertext marker in a document. Provides a detailed explanation for all parsing and validation errors (e.g. missing argument, unresolved link).

The /tmp Directory Warning warns the user when a document is opened into, saved within, or exited from the /tmp directory. For example, when the user double clicks on an E-mail attachment, the following warning is displayed:

Warning: This document has been placed in /tmp. This is temporary storage that may cause problems with recovering the document in the future. If you want to keep this document, use "File menu>Save as" to make a copy in a different directory.

Create Table to Chart automatically creates a table based on user data (e.g. number of categories, number of series) and the type of chart you want to create. The table that is created is used as a template for data entry, as each table cell identifies the data that must be added.

Compare Paragraph Formats Document Report compares two paragraph formats and lists the properties that are different.

Global Hyphenation turns hyphenation on or off for all or a subset of paragraphs and cataloged paragraph formats in a document.

EASYRIDER Toolbar includes seven palettes of buttons that add new functionality as well as provide easier access to existing commands. New functionality includes: silently print current or all pages of an opened document (Print dialog box is not displayed but its settings are used); silently save opened document as Text Only, Interchange, or PostScript; move graphic object(s) one level up or down; rotate an object one degree in either direction; create drop shadow with fixed offset and fill; and buttons to invoke export clients (UNIX Compression, GZIP Compression, DES Encryption), Personal Preferences, Chart It, Sum Columns, Global a Hyphenation, Create Table for Chart It, EASY Sort, Add Rotated Pages, Copy Pages. The toolbar is customizable.

Transfer Document to Server silently creates a file in PostScript, normal, view only, or text only format and transfers it to a server.

File Manager allows you to copy, rename, delete, and print a document without opening it. Print allows you to use another document's print settings.

Personal Preferences automatically sets more than 90 session and document properties in your document. The client can silently set properties found in $HOME/.preferences or query for name of preferences file each time. It can apply the properties only when the Personal Preferences command is manually executed or automatically upon opening a document.

Chart It creates data driven graphics tightly integrated in FrameMaker®. Features include: a command to create a chart is executed within FrameMaker®; eight chart types, two data modes, and a rich set of options; creating a chart with data from a FrameMaker® table, text-only file, or dialog box; easily formatting chart items with a user-friendly dialog box or custom style guides; creating charts made up of FrameMaker® line-drawn graphics; and easily resizing, editing, enhancing, or recreating the chart you created.

Drop Shadow allows the user to create a drop shadow for selected graphic object(s).

Easy Sort sorts and collates rows contained in a FrameMaker® table. Performs primary and secondary sorts. Sort modes include alphanumeric, numeric, and month. Sortfields can be the entire contents of the cell or substring.

Sum Columns sums selected cells or entire table. Prints results in existing or new body row. Can also print results in existing or new footing row.

Table Export provides choice of two modes to export a table to an ASCII file in a format that retains tabular structure.

Table Transpose transposes a table, i.e. rows become columns and columns become rows, retains paragraph and character formats, allows one to transpose heading/footing row(s) as 1st/last column(s), and handles straddled cells.

Redline creates workgroup environment, allowing several editors or reviewers to collaborate on preparing a document, provides an intuitive mechanism for marking-up a document with additions, deletions, and "sticky" notes, marks proposed changes with revised text color, inserted text mark, and revised line mark, and provides easy mechanism to review, accept, and reject the proposed changes individually or collectively.

Line Count Document Report reports the number of lines (excluding tables) in the document.

Paragraph Format Document Report creates a single table listing 56 paragraph format property names and values for the currently selected paragraph or specified format tag.

Page Count Book Report reports on the number of pages of a book by invisibly opening its components.

CGM Import Client converts and imports a CGM file in a format that can be edited in a FrameMaker® document.

UNIX Compression Import Filter is an import filter that automatically uncompresses a UNIX compressed document upon opening.

UNIX Compression Export Client saves a document in UNIX compressed format.

GZIP Compression Import Filter is an import filter that automatically uncompresses a GZIP compressed document upon opening.

GZIP Compression Export Client saves a document in GZIP compressed format.

DES Encryption Import Filter is an import filter that automatically decrypts a DES encrypted document upon opening.

DES Encryption Export Client saves a document in DES encrypted format.

The present invention converts a relatively small display into one containing relatively large menus, large window borders, large cursors, and large dialog boxes. The present invention provides maximum discriminability of fonts and cursors whereas FrameMaker® that is not enhanced by the present invention (unenhanced FrameMaker® provides poor discriminability of fonts and cursors. The present invention provides high contrast between key background and text/graphics whereas unenhanced FrameMaker® provides low contrast. The present invention automatically magnifies documents, on-line help, and manuals whereas unenhanced FrameMaker® requires manual magnification if at all. The present invention provides seven individual toolbars collocating 130 common commands which are displayed in large, high contrast lettering whereas unenhanced FrameMaker® only provides one 4-page toolbar of 65 commands displayed in low contrast, tiny graphics. The present invention applies these improvements automatically whereas unenhanced FrameMaker® would require a large number of steps, but only if the user was sophisticated enough to know the internal workings of FrameMaker® including undocumented features. The present invention does not require the user to be so sophisticated.

FIG. 1 is a chart of the directories and files used in the present invention. $HOME is the user's home directory. The file ".maker.large" is an empty file whose existence indicates a user's desire to employ a large display while using FrameMaker®. The file ".preferences" is a file in which are stored values of properties (e.g., zoom, size) used by the Personal Preferences API client. The file ".Xdefaults" contains an option that specifies that Personal Preferences should automatically apply properties found in the file ".preferences" upon opening a FrameMaker® document, on-line help, or manual. The directory "$FMHOME" is a FrameMaker® installation directory. The file "finclient" is a file for starting FrameMaker® which, upon sensing the existence of the file ".maker.large", loads X resources residing in the file "Xres.large" and sets an environmental variable $EZRIDER to the file "NSAapps.large" to be used in initializing API clients. The file "Xres.large" is a file of X resources used for changing fonts, menus, window borders, dialog windows, colors, and cursors. The directory "NSAapps" is an EASYRIDER installation directory containing executable binaries and client files for normal, not large, display of all API clients. The directory "NSAapps.large" contains enlarged client files (dialog resources, button palettes) for 14 EASYRIDER API clients. The directory "bitmaps" contains source and mask bitmap files for enlarged, and normal, cursors. The file "apiclients" is an API client registration file containing the pathname of the command within the file "NSAapps" to start a client and of directory $EZRIDER as the location of client files. The file "xresources_ck" contains alternate large display dialog resources used for Chinese and Korean fonts on IBM and HP computers.

Figure 2:
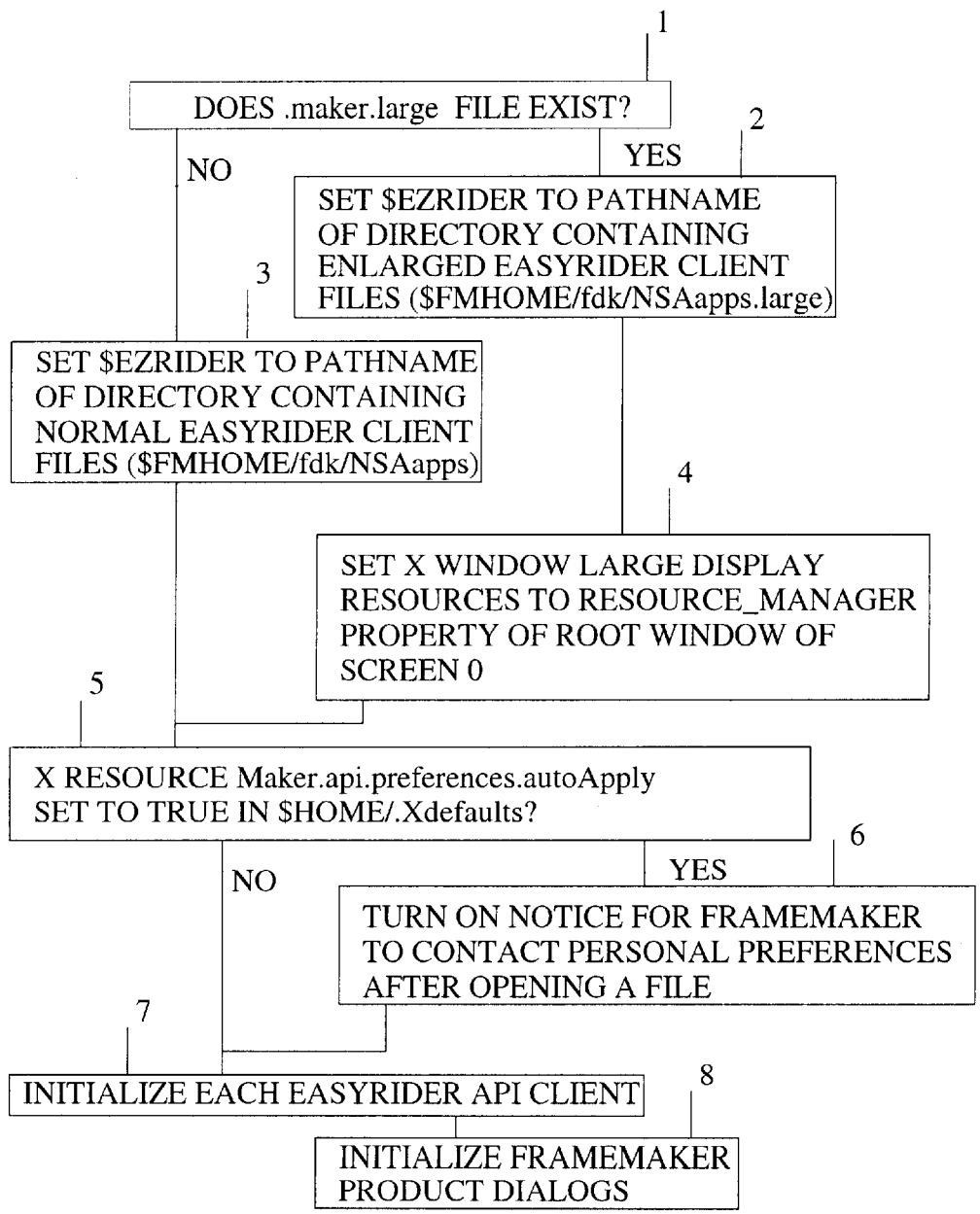
FIG. 2 is a flow-chart of the present invention.

FIG. 2 is a flow chart of the present invention. If the user desires to work with a version of FrameMaker® with its readability enhanced by the present invention then the empty file ".maker.large" must be added to the user's $HOME director. The first step 1 upon the activation of FrameMaker® in an X Window System is determining whether or not the file ".maker.large" exists in the user's $HOME directory.

If the file ".maker.large" is in $HOME then the second step 2 is setting an environmental variable $EZRIDER to the pathname of the directory containing the enlarged EASYRIDER client files (i.e., $FMHOME/fdk/NSAapps.large).

If the file ".maker.large" is not in $HOME then the third step 3 is setting the environmental variable $EZRIDER to the pathname of the directory containing the normal, not enlarged, EASYRIDER client files (i.e., $FMHOME/fdk/NSAapps).

If the second step 2 was performed then the fourth step 4 is setting the X Window Large Display Resources into RESOURCE_MANAGER property of the root window of screen 0. The exact steps required to perform the fourth step 4 are discussed below and disclosed in FIGS. 3 and 4.

After either the third step 3 or the fourth step 4, the fifth step 5 is determining whether or not the X resource "Maker.api.preferences.autoApply" is set to true in $HOME/.Xdefaults.

If the X resource "Maker.api.preferences.autoApply" is set to true then the sixth step 6 is turning on the notification for FrameMaker® to contact Personal Preferences after the user opens any file. The Personal Preferences client is discussed below and disclosed in FIG. 7. Personal Preferences is an API client from EASYRIDER which allows a user to automatically set values for session and document properties in the document that is currently active. Personal Preferences may be configured to automatically apply zoom and size settings upon opening a document or creating a new one. The zoom setting will also automatically enlarge FrameMaker® and EASYRIDER view-only on-line help documents and on-line manuals. These view-only documents are unaffected by width and height settings but will automatically resize so the window fits the zoomed page. Zoom, width, and height are just three of a large number of properties that may be set using Personal Preferences.

The seventh step 7 is initializing each EASYRIDER API clients. The details for executing the seventh step 7 are discussed below and disclosed in FIG. 5.

The eighth step 8 is initializing FrameMaker® product dialogs. The details for executing the eighth step 8 are discussed below and disclosed in FIG. 6.

Figure 3:
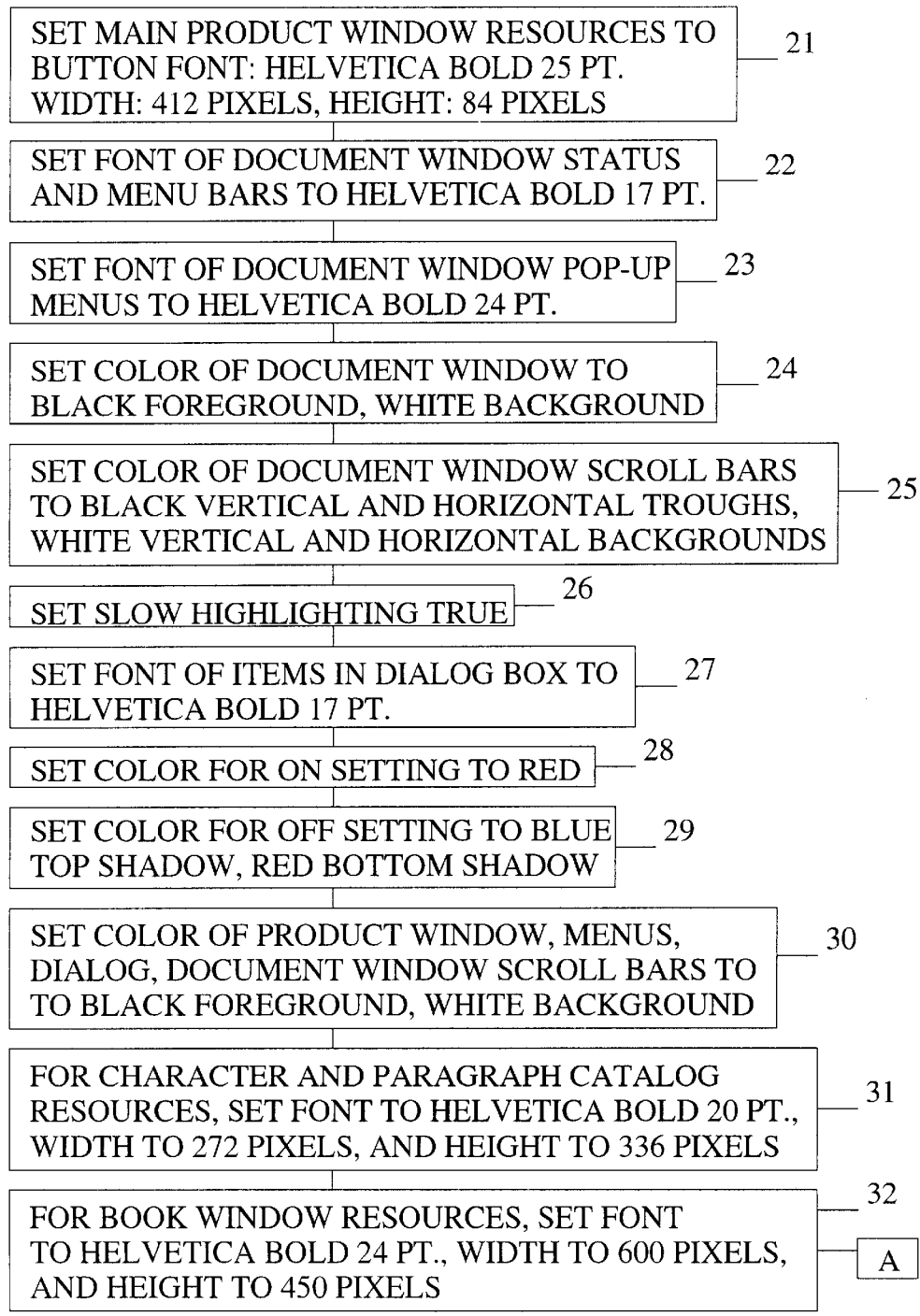
FIG. 3 is a first part of a flow-chart for realizing step 4 of FIG. 2.
Figure 4:
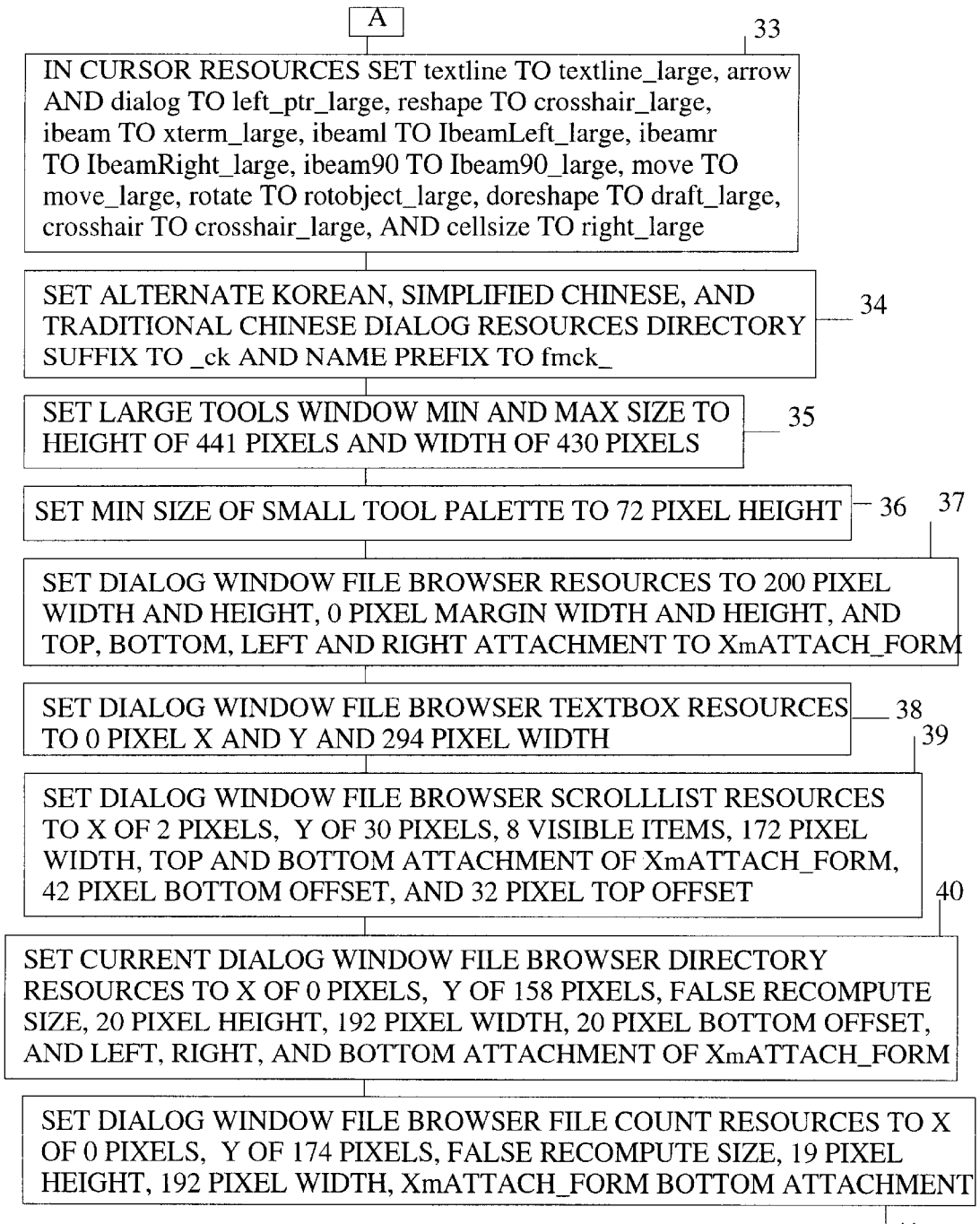
FIG. 4 is a second part of the flow-chart of FIG. 3.

FIGS. 3 and 4 disclose the steps for performing the fourth step 4 of FIG. 2 (i.e., setting the X Window Large Display Resources into RESOURCE_MANAGER property of the root window of screen 0). The first step 21 of FIGS. 3 and 4 is setting the resources for the main product window to a button font to 25 point Helvetica bold, a width of 412 pixels, and a height of 84 pixels.

The second step 22 is setting the font resources for the document window status bar and menu bar to a font of 17 point Helvetica bold.

The third step 23 is setting the font resources for the document window pop-up menus to a font of 24 point Helvetica bold.

The fourth step 24 is setting the color resources for the document window so that the foreground and the background are complementary colors. The use of complementary colors provides the maximum contract between the foreground and the background. In the preferred embodiment, the foreground is black and the background is white.

The fifth step 25 is setting the color resources of the document window scroll bars so that the background and the trough are complementary colors. In the preferred embodiment, the vertical background and the horizontal background are white while the vertical trough and the horizontal trough are black.

The sixth step 26 is setting the resource to make it easier to read colored text that is highlighted by setting slow highlighting to true.

The seventh step 7 is setting the font resource for the dialog boxes for scroll list items to 17 point Helvetica bold and all other items to 17 point Helvetica bold.

The eighth step 28 is setting the resources to make it easier to distinguish the "ON" setting from the "OFF" setting by selecting the color red for the "ON" setting.

The ninth step 29 is setting the color resources to make it easier to distinguish the "OFF" setting from the "AS IS" setting by making the top shadow and the bottom shadow complementary colors. In the preferred embodiment, the top shadow is set to blue while the bottom shadow is set to red.

The tenth step 30 is setting the color resources in the main product window, the menus, the dialogs, and the document window scroll bars so that the foreground and the background are complementary colors. In the preferred embodiment, the foreground is black and the background is white.

The eleventh step 31 is setting the resources for the Character Catalog and the Paragraph Catalog to a font of 20 point Helvetica bold, a width of 272 pixels, and a height of 336 pixels.

The twelfth step 32 is setting the resources for the Book window to a font of 24 point Helvetica bold, a width of 600 pixels, and a height of 450 pixels.

Continuing on FIG. 4, the thirteenth step is setting resources for the cursors to a textline of "textline_large", an arrow of "left_ptr_large", a reshape of "crosshair_large", a dialog of "left_ptr large", an ibeam of "xterm_large", an ibeaml of "IbeamLeft_large", an ibeamr of "IbeamRight_large", an ibeam90 of "Ibeam90_large", a move of "move_large", a rotate of "rotobject large", a doreshape of "draft_large", a crosshair of "crosshair_large", and a cellresize of "right_large." The cursor bitmaps are stored in $FMHOME/fminit/bitmaps except "draft_large" which is a standard X11 cursor. The contents of these bitmaps are as follows:

```
textline_large
#define textline_large_width 16
#define textline_large_height 16
#define textline_large_x_hot 7
#define textline_large_y_hot 10
static unsigned char textline_large_bits[ ]={0x38, 0x0e,
    0x60, 0x03, 0xc0, 0x01, 0xc0, 0x01, 0xc0, 0x01, 0xc0,
    0x01, 0xc0, 0x01, 0xc0, 0x01, 0xc0, 0x01, 0xc0, 0x01,
    0xc0, 0x01, 0xf8, 0x0f, 0xf8, 0x0f, 0xc0, 0x01, 0xc0,
    0x01, 0x60, 0x03, 0x38, 0x0e};
textline_largeMask
#define textline_largeMask_width 16
#define textline_largeMask_height 16
static unsigned char textline_largeMask_bits[ ]={0xfc,
    0x1f, 0xf0, 0x07, 0xe0, 0x03, 0xe0, 0x03, 0xe0, 0x03,
    0xe0, 0x03, 0xe0, 0x03, 0xe0, 0x03, 0xe0, 0x03, 0xe0,
    0x03, 0xfc, 0x1f, 0xfc, 0x1f, 0xe0, 0x03, 0xe0, 0x03,
    0xf0, 0x07, 0xfc, 0x1f};
left_ptr_large
#define left_ptr_large_width 16
#define left_ptr_large_height 16
#define left_ptr_large_x_hot 1
#define left_ptr_large_y_hot 0
static unsigned char left_ptr_large_bits[ ]={0x06, 0x00,
    0x1e, 0x00, 0x3e, 0x00, 0x76, 0x00, 0xe6, 0x00, 0xc6,
    0x01, 0xe6, 0x03, 0x7e, 0x00, 0xfe, 0x00, 0xe6, 0x00,
    0xc0, 0x01, 0xc0, 0x01, 0x80, 0x03, 0x80, 0x03, 0x00,
    0x07, 0x00, 0x07};
left_ptr_largeMask
#define left_ptr_largeMask_width 16
#define left_ptr_largeMask_height 16
static unsigned char left_ptr_largeMask_bits[ ]={0x0f,
    0x00, 0x3f, 0x00, 0x7f, 0x00, 0xff, 0x00, 0xff, 0x01, 0xff,
    0x03, 0xff, 0x07, 0xff, 0x00, 0xff, 0x00, 0xff, 0x01, 0xe0,
    0x03, 0xe0, 0x03, 0xc0, 0x07, 0xc0, 0x07, 0x80, 0x0f,
    0x80, 0x0f};
crosshair_large
#define crosshair_large_width 16
#define crosshair_large_height 16
#define crosshair_large_x_hot 7
#define crosshair_large_y_hot 7
static unsigned char crosshair_large_bits[ ]={0x00, 0x00,
    0xc0, 0x01, 0xc0, 0x01, 0xc0, 0x01, 0xc0, 0x01, 0xfe,
    0x7f, 0xfe, 0x7f, 0xfe, 0x7f, 0xc0, 0x01, 0xc0, 0x01,
    0xc0, 0x01, 0xc0, 0x01, 0xc0, 0x01, 0xc0, 0x01, 0x00,
    0x00};
crosshair_largeMask
#define crosshair_largeMask_width 16
#define crosshair_largeMask_height 16
static unsigned char crosshair_largeMask_bits[ ]={0xe0,
    0x03, 0xe0, 0x03, 0xe0, 0x03, 0xe0, 0x03, 0xe0, 0x03,
    0xff, 0xff, 0xff, 0xff, 0xff, 0xff, 0xff, 0xff, 0xff, 0xe0,
    0x03, 0xe0, 0x03, 0xe0, 0x03, 0xe0, 0x03, 0xe0, 0x03,
    0xe0, 0x03};
xterm_large
#define xterm_large_width 16
#define xterm_large_height 16
#define xterm_large_x_hot 7
#define xterm_large_y_hot 8
static unsigned char xterm_large_bits[ ]={0x38, 0x0e,
    0x60, 0x03, 0xc0, 0x01, 0xc0, 0x01, 0xc0, 0x01, 0xc0,
    0x01, 0xc0, 0x01, 0xc0, 0x01, 0xc0, 0x01, 0xc0, 0x01,
    0xc0, 0x01, 0xc0, 0x01, 0xc0, 0x01, 0xc0, 0x01, 0x60,
    0x03, 0x38, 0x0e};
xterm_largeMask
#define xterm_largeMask_width 16
#define xterm_largeMask_height 16
static unsigned char xterm_largeMask_bits[ ]{0xfc, 0x1f,
    0xf0, 0x07, 0xe0, 0x03, 0xe0, 0x03, 0xe0, 0x03, 0xe0,
    0x03, 0xe0, 0x03, 0xe0, 0x03, 0xe0, 0x03, 0xe0, 0x03,
    0xe0, 0x03, 0xe0, 0x03, 0xf0, 0x07, 0xfc, 0x1f};
IbeamLeft_large
#define IbeamLeft_large_width 16
#define IbeamLeft_large_height 16
#define IbeamLeft_large_x_hot 8
#define IbeamLeft_large_hot 8
static unsigned char IbeamLeft_large_bits[ ]={0xe0, 0x00,
    0x70, 0x00, 0x30, 0x00, 0x38, 0x00, 0x7e, 0x00, 0xff,
```

```
0x00, 0xe3, 0x01, 0xc1, 0x03, 0x80, 0x07, 0x00, 0x8f,
0x00, 0xde, 0x00, 0xfc, 0x00, 0x78, 0x00, 0x18, 0x00,
0x1c, 0x00, 0x0e};
IbeamLeft_largeMask
#define IbeamLeft_largeMask_width 16
#define IbeamLeft_largeMask_height 16
static unsigned char IbeamLeft_largeMask_bits[ ]={0xf0,
    0x01, 0xf8, 0x00, 0x78, 0x00, 0x7e, 0x00, 0xff, 0x00,
    0xff, 0x01, 0xff, 0x03, 0xe3, 0x07, 0xc0, 0x8f, 0x80,
    0xdf, 0x00, 0xff, 0x00, 0xfe, 0x00, 0xfc, 0x00, 0x7c,
    0x00, 0x3e, 0x00, 0x1f};
IbeamRight_large
#define IbeamRight_large_width 16
#define IbeamRight_large_height 16
#define IbeamRight_large_x_hot 7
#define IbeamRight_large_hot 8
static unsigned char IbeamRight_large bits[ ]={0x00, 0x07,
    0x00, 0x0e, 0x00, 0x0c, 0x00, 0x1c, 0x00, 0x7c, 0x00,
    0xfe, 0x00, 0xcf, 0x80, 0x87, 0xc0, 0x03, 0xe1, 0x01,
    0xf3, 0x00, 0x7f, 0x00, 0x3e, 0x00, 0x18, 0x00, 0x38,
    0x00, 0x70, 0x00};
IbeamRight_largeMask
#define IbeamRight_largeMask_width 16
#define IbeamRight_largeMask_height 16
static unsigned char IbeamRight_largeMask_bits[
    ]={0x00, 0x0f, 0x00, 0x1f, 0x00, 0x1e, 0x00, 0x7e, 0x00,
    0xfe, 0x00, 0xff, 0x80, 0xff, 0xc0, 0xcf, 0xe1, 0x87, 0xf3,
    0x03, 0xff, 0x01, 0xff, 0x00, 0x7f, 0x00, 0x3e, 0x00,
    0x7c, 0x00, 0xf8, 0x00};
Ibeam90_large
#define Ibeam90_large_width 16
#define Ibeam90_large_height 16
#define Ibeam90_large_x_hot 7
#define Ibeam90_large_y_hot 7
static unsigned char Ibeam90_large_bits[ ]{0x00, 0x00,
    0x00, 0x00, 0x01, 0x80, 0x01, 0x80, 0x03, 0xc0, 0x03,
    0xc0, 0xfe, 0x7f, 0xfc, 0x3f, 0xfc, 0x3f, 0xfe, 0x7f, 0x03,
    0xc0, 0x03, 0xc0, 0x01, 0x80, 0x01, 0x80, 0x00, 0x00,
    0x00, 0x00};
Ibeam90_largeMask
#define Ibeam90_largeMask_width 16
#define Ibeam90_largeMask_height 16
static unsigned char Ibeam90_largeMask_bits[ ]={0x00,
    0x00, 0x01, 0x80, 0x01, 0x80, 0x03, 0xc0, 0x03, 0xc0,
    0xff, 0xff, 0xff, 0xff, 0xff, 0xff, 0xff, 0xff, 0xff, 0xff,
    0xff, 0x03, 0xc0, 0x03, 0xc0, 0x01, 0x80, 0x01, 0x80,
    0x00, 0x00};
move_large
#define move_large_width 16
#define move_large_height 16
#define move_large_x_hot 3
#define move_large_y_hot 0
static unsigned char move_large_bits[ ]={0x18, 0x00,
    0x38, 0x00, 0x78, 0x00, 0xf8, 0x00, 0xd8, 0x01, 0x98,
    0x03, 0x18, 0x07, 0x98, 0x0f, 0xf8, 0x1, 0xb8, 0x03,
    0x98, 0x03, 0x00, 0x07, 0x00, 0x07, 0x00, 0x0e, 0x00,
    0x0e, 0x00, 0x1c};
move large_Mask
#define move_larg_Mask width 16
#define move_large_Mask height 16
static unsigned char move_largeMask bits[ ]={0x3c, 0x00,
    0x7c, 0x00, 0xfc, 0x00, 0xfc, 0x01, 0xfc, 0x03, 0xfc,
    0x07, 0xfc, 0x0f, 0xfc, 0x1f, 0xfc, 0x03, 0xfc, 0x07,
    0x9c, 0x07, 0x00, 0x0f, 0x00, 0x0f, 0x00, 0x1e, 0x00,
    0x1e, 0x00, 0x3c};
```

```
rotobject_large
#define rotobject_large_width 16
#define rotobject_large_height 16
#define rotobject_large_x_hot 0
#define rotobject_large_x_hot 0
static unsigned char rotobject_large_bits[ ]={0x01, 0x00,
    0x03, 0x00, 0x07, 0x00, 0x0f, 0x00, 0x1f, 0x00, 0x3f,
    0xf8, 0x7f, 0xe0, 0x0f0, 0xf0, 0x1b, 0xb9, 0x19, 0x9d,
    0x30, 0x0f, 0x30, 0x07, 0x60, 0x1f, 0x60, 0x00, 0xc0,
    0x00, 0xc0, 0x00};
rotobject_largeMask
#define rotobject_largeMask_width 16
#define rotobject_largeMask_height 16
static unsigned char rotobject_largeMask_bits[ ]={0x07,
    0x00, 0x0f, 0x00, 0x1f, 0x00, 0x3f, 0x00, 0x7f, 0xfc,
    0xff, 0xfc, 0xff, 0xfc, 0xff, 0xf8, 0xff, 0xfd, 0xff, 0xff,
    0xff, 0xff, 0xf8, 0x3f, 0xf0, 0x3f, 0xf0, 0x3f, 0xe0, 0x01,
    0xe0, 0x01 };
right_large
#define right_large_width 16
#define right_large_height 16
#define right_large_x_hot 0
#define right_large_y_hot 8
static unsigned char right_large_bits[ ]={0x00, 0x00, 0x00,
    0x00, 0x00, 0x60, 0x00, 0x38, 0x00, 0x3e, 0x80, 0x1f,
    0xe0, 0x1f, 0xf8, 0x0f, 0xfe, 0x07, 0xf8, 0x0f, 0xe0, 0x1f,
    0x80, 0x1f, 0x00, 0x3e, 0x00, 0x38, 0x00, 0x60, 0x00,
    0x00};
right_largeMask
#define right_largeMask_width 16
#define right_largeMask_height 16
static unsigned char right_largeMask_bits[ ]={0x00, 0x00,
    0x00, 0xe0, 0x00, 0xf8, 0x00, 0x7e, 0x80, 0x7f, 0xe0,
    0x3f, 0xf8, 0x3f, 0xff, 0x1f, 0xff, 0x0f, 0xff, 0x1f, 0xf8,
    0x3f, 0xe0, 0x3f, 0x80, 0x7f, 0x00, 0x7e, 0x00, 0xf8,
    0x00, 0xe0}.
```

Figure 8:
FIGS. 8–10 are charts of large cursors generated by the present invention.
Figure 8:
Figure 8:
Figure 8:
Figure 8:
Figure 8:
Figure 8:
Figure 8:
Figure 9:
Figure 9:
Figure 9:
Figure 9:
Figure 9:
Figure 9:
Figure 9:
Figure 9:
Figure 10:
Figure 10:
Figure 10:
Figure 10:

Each cursor consists of two files, a source bitmap and a mask bitmap. The source bitmap contains a spot known as the hot spot which is the point that indicates the point on which the cursor clicks when clicked (e.g., the tip of an arrow). Each bitmap is a 16×16 array of pixels whose values are 0 or 1. For pixels where the mask is 0, the image displays nothing, producing a transparent effect. For other pixels, the image displays black if the source data is 1 and white if the source data is 0. FIGS. 8–10 show the cursors resulting from the bitmaps above.

The fourteenth step 34 listed in FIG. 4 is setting the resources for using alternate dialogs to a directory suffix of "_ck" and a name prefix of "fmck_." The alternate dialogs at this location were originally created for FrameMaker® to handle the larger fonts of the Chinese and Korean languages. The present invention applies these alternate dialogs for use with any language.

The fifteenth step 35 is setting size resources for the Large Tools window by setting the minimum and maximum height to 441 pixels and the minimum and maximum width to 430 pixels.

The sixteenth step 36 is setting the size resource for the Small Tool palette to a minimum height of 72 pixels.

The seventeenth step 37 is setting general resources for all file browsers in the dialog windows to a height and width of 200 pixels, a margin height and width of 0 pixels, and the top attachment, bottom attachment, left attachment, and right attachment to "XmATTACH_FORM."

The eighteenth step 38 is setting the textbox resources for all file browsers in the dialog windows to an x and y of 0 pixels and a width of 294 pixels.

The nineteenth step 39 is setting the scrolllist resources for all of the file browsers in the dialog windows to an x of 2 pixels, a y of 30 pixels, a visible item count of 8, a width of 172 pixels, a bottom offset of 42 pixels, a top offset of 32 pixels, and a top attachment and a bottom attachment of "XmATTACH_FORM."

The twentieth step 40 is setting the resources for the current directory for all of the file browsers in the dialog windows to an x of 0 pixels, a y of 158 pixels, a recompute size of false, a height of 20 pixels, a width of 192 pixels, a bottom offset of 20 pixels, and a left attachment, a right attachment, and a bottom attachment of "XmATTACH_FORM."

The twenty-first, and last, step 41 is setting the resources of the file count for all of the file browsers in the dialog windows to an x of 0 pixels, a y of 174 pixels, a recompute size of false, a height of 19 pixels, a width of 192 pixels, and a bottom attachment of "XmATTACH_FORM."

The code that implements the steps listed in FIGS. 3 and 4 may be as follows.

```
! font sizes available for-adobe-helvetica-bold-r-normal
! determined by running the command "xlsfonts|grep 8859|more"
! 8 10 11 12 14 17 18 20 24 25 34 available
! Main product window
! Buttons (default: 14)
Maker.makerkit.form*.fontList: -adobe-helvetica-bold-r-normal--25-*-iso8859-1
! Size and coordinates WidthxHeight+X+Y (default: 322x66+780+0)
Maker.makerkit.geometry: 412x84+0+0
! Document window
! Upon opening, API client Personal Preferences automatically zooms and resizes
! Enable the API client by selecting File>Utilites>API Client Manager
! and add the following lines to the text-only file $HOME/.preferences:
! Zoom MetricT 150
! ScreenWidth IntT 963
! ScreenHeight IntT 780
! Automatically apply properties in $HOME/.preferences upon opening
! If set to False, can manually apply properties by executing
! File>Personal Preferences
! Maker.api.preferences.autoApply: True
! Items in the status bar and menu bar (default: 12)
! Maker*dockit*fontList: -adobe-helvetica-bold-r-normal--17-*-iso8859-1
! Items in pop-up menus (default: 12)
! Maker*XmMenuShell*fontList: -adobe-helvetica-bold-r-normal--24-*-iso8859-1

! Foreground color
          Maker*winRect.foreground:         black
          ! Background color
          Maker*winRect.background:         white
          ! Color of scroll bars
          Maker*vertSB.background:          white
          Maker*vertSB.troughColor:         black
          Maker*horizSB.background:         white
          Maker*horizSB.troughColor:        black
```

```
! To make it easier to read colored text that is highlighted
Maker.slowHighlightingForColor: True
! Dialog boxes
! Font for scroll list items (default: 10)
Maker*XmDialogShell*XmList*fontList: -adobe-helvetica-bold-r-normal--17-*-iso8859-1
! Font for all other items (default: 12)
Maker*XmDialogShell*fontList: -adobe-helvetica-bold-r-normal--17-*-iso8859-1
! If a dialog menu contains more than the specified number of items,
! the FrameMaker® product will pop up a scrolling list instead (default: 140)
```

```
Maker.maxItemsInAMenu:                              140
! Width of menus (default: 250)
Maker.menuListWidth:                                250
! Height of menus (default: 864)
Maker.menuListHeight:                               864
! To make it easier to distinguish On from Off settings
Maker*selectColor:                                  red
! To make it easier to distinguish Off from As Is settings
! #0000FF: blue; #FF0000 red (#RRGGBB)
Maker*topShadowColor:                               #0000FF
Maker*bottomShadowColor:                            #FF0000
! Colors in the main product window, menus,
dialogs, and document window scroll bars
! Foreground color (default: black)
Maker* foreground:                                  black
! Background color (default: lightgray)
Maker*background:                                   white
! Character Catalog
! Font for scroll list items and Delete button (default: 10):
Maker.cCatalog.form.*.fontList:
-adobe-helvetica-bold-r-normal--20-*-iso8859-1
! Width (default: 136)
Maker.cCatalog.form.width:                          272
! Height (default: 168)
Maker.cCatalog.form.height:                         336
! Paragraph Catalog
! Font for list items and Delete button (default: 10):
Maker.pCatalog.form.*.fontList:
-adobe-helvetica-bold-r-normal--20-*-iso8859-1
! Width (default: 136)
Maker.pCatalog.form.width:                          272
! Height (default: 168)
Maker.pCatalog.form.height:                         336
! Book window
! Font for menus, command names, scroll list items, and status messages (default: 12)
Maker.bookkit*fontList:
-adobe-helvetica-bold-r-normal--24-*-iso8859-1
! Newly created book window width (default: 300)
Maker.bookkit.form.width:                           600
! Newly created book window height (default: 225)
Maker.bookkit.form.height:                          450
! hand-made large cursor bitmaps stored in $FMHOME/fminit/bitmaps
! except for draft_large which a standard X11 cursor
! each has a bitmap for cursor mask named cursornameMask (e.g. textline_largeMask)
!
Maker.Cursor.textline:                              textline_large
Maker.Cursor.arrow:                                 left_ptr_large
Maker.Cursor.reshape:                               crosshair_large
Maker.Cursor.dialog:                                left_ptr_large
Maker.Cursor.ibeam:                                 xterm_large
Maker.Cursor.ibeaml:                                IbeamLeft_large
Maker.Cursor.ibeamr:                                IbeamRight_large
```

-continued

| | |
|---|---|
| Maker.Cursor.ibeam90: | Ibeam90_large |
| Maker.Cursor.move: | move_large |
| Maker.Cursor.rotate: | rotobject_large |
| Maker.Cursor.doreshape: | draft_large |
| Maker.Cursor.crosshair: | crosshair_large |
| Maker.Cursor.cellsresize: | right_large |
| ! Do not make changes from here to the end | |
| ! Settings to use alternate xresources_ck dialogs | |
| ! | |
| Maker.xresDirSuffix: | _ck |
| Maker.xresNamePrefix: | fmck_ |
| ! Display Tools Palette: | |
| Maker.initialToolsPaletteSize: | Large |
| ! Large Tools window coordinates and size: | |
| Maker.tools.maxHeight: | 441 |
| Maker.tools.maxWidth: | 430 |
| Maker.tools.minHeight: | 441 |
| Maker.tools.minWidth: | 430 |
| ! Size of Small Tools Palette (default: 52): | |
| Maker.smtools.minWidth: | 72 |
| ! For all of the File Browsers in Dialog Windows | |
| Maker.*.filebrowser.width: | 200 |
| Maker.*.filebrowser.height: | 200 |
| Maker.*.filebrowser.marginWidth: | 0 |
| Maker.*.filebrowser.marginHeight: | 0 |
| Maker.*.filebrowser.textbox.x: | 0 |
| Maker.*.filebrowser.textbox.y: | 0 |
| Maker.*.filebrowser.textbox.width: | 294 |
| Maker.*.filebrowser.scrolllist.x: | 2 |
| Maker.*.filebrowser.scrolllist.y: | 30 |
| Maker.*.filebrowser.scrolllist.listb.visibleItemCount: | 8 |
| Maker.*.filebrowser.scrolllist.listb.Width: | 172 |
| Maker.*.filebrowser.curdir.x: | 0 |
| Maker.*.filebrowser.curdir.y: | 158 |
| Maker.*.filebrowser.curdir.labelString: | |
| Maker.*.filebrowser.curdir.recomputeSize: | False |
| Maker.*.filebrowser.curdir.height: | 20 |
| !Maker.*.filebrowser.curdir.width: | 192 |
| Maker.*.filebrowser.curdir.leftAttachment: | XmATTACH_FORM |
| Maker.*.filebrowser.curdir.rightAttachment: | XmATTACH_FORM |
| Maker.*.filebrowser.filecnt.x: | 0 |
| Maker.*.filebrowser.filecnt.y: | 174 |
| Maker.*.filebrowser.filecnt.labelString: | 1 Directory, 2 Files |
| Maker.*.filebrowser.filecnt.recomputeSize: | False |
| Maker.*.filebrowser.filecnt.height: | 19 |
| Maker.*.filebrowser.filecnt.width: | 192 |
| Maker.*.filebrowser.topAttachment: | XmATTACH_FORM |
| Maker.*.filebrowser.bottomAttachment: | XmATTACH_FORM |
| Maker.*.filebrowser*leftAttachment: | XmATTACH_FORM |
| Maker.*.filebrowser.*.rightAttachment: | XmATTACH_FORM |
| Maker.*.filebrowser.scrolllist.bottomAttachment: | XmATTACH_FORM |
| Maker.*.filebrowser.scrolllist.topAttachment: | XmATTACH_FORM |
| Maker.*.filebrowser.curdir.bottomAttachment: | XmATTACH_FORM |
| Maker.*.filebrowser.filecnt.bottomAttachment: | XmATTACH_FORM |
| Maker.*.filebrowser.scrolllist.bottomOffset | 42 |
| Maker.*.filebrowser.scrolllist.topOffset: | 32 |
| Maker.*.filebrowser.curdir.bottomOffset: | 20 |

Figure 5:
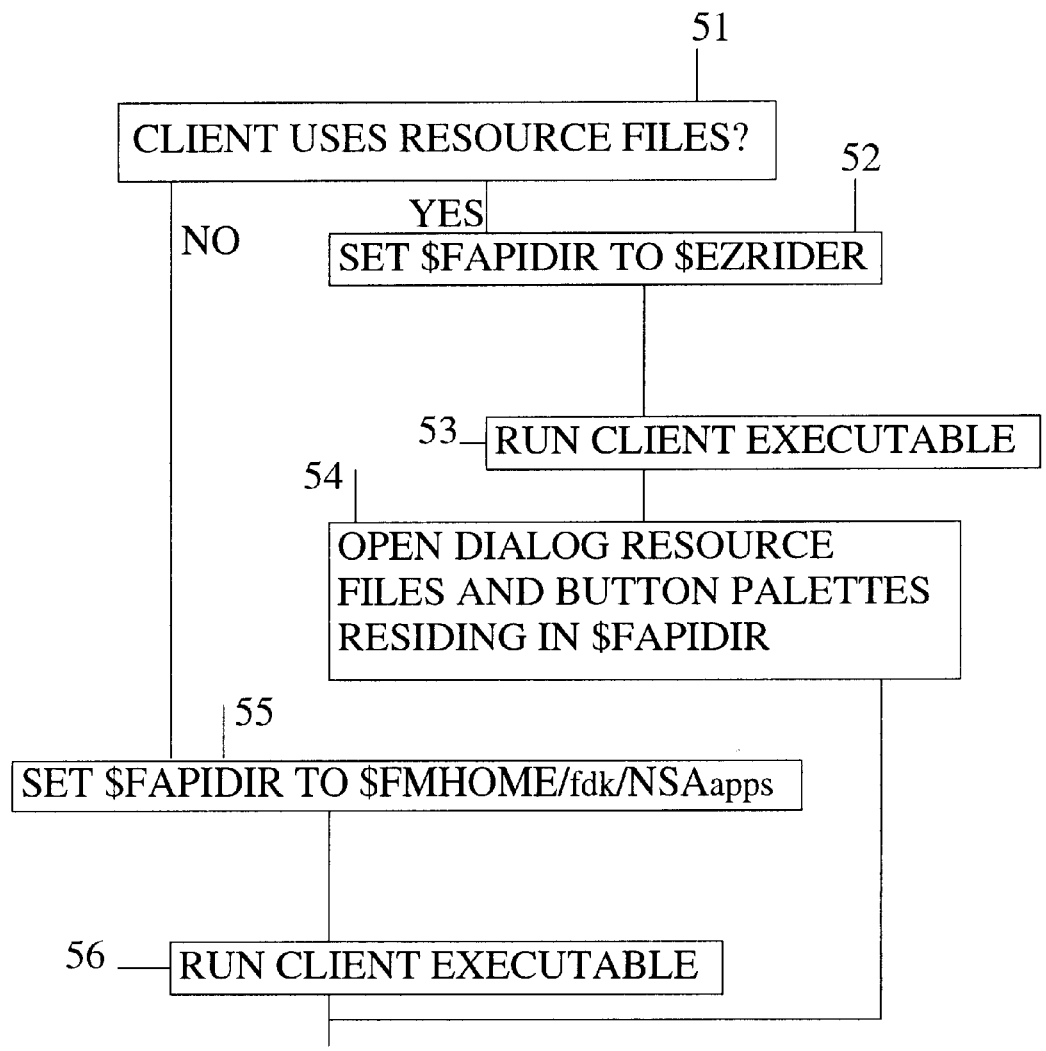
FIG. 5 is a flow-chart for realizing step 7 of FIG. 2.

The steps for realizing the seventh step 7 of FIG. 2 are listed in FIG. 5. The first step is determining whether or not the client uses resource files.

If it is determined in the first step 51 that the client uses resource files then the second step 52 is setting the environmental variable $FAPIDIR to $EZRIDER, where $EZRIDER is the current client's directory of normal sized or enlarged files.

If the second step 52 is conducted then the third step 53 is running the client executables.

If the third step 53 is executed then the fourth step 54 is opening the dialog resource files and button palettes residing in $FAPIDIR.

If it is determined in the first step 51 that the client does not use resource files then the fifth step is setting the environmental variable $FAPIDIR to $FMHOME/fdk/NSAapps.

If the fifth step 51 is executed then the sixth step 56 is running the client executables.

Figure 6:
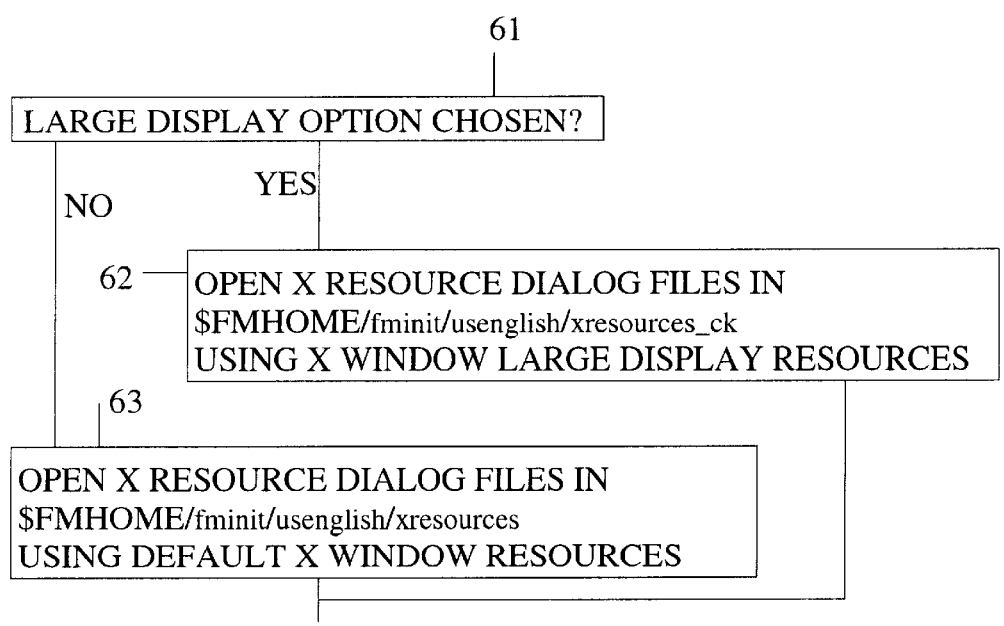
FIG. 6 is a flow-chart for realizing step 8 of FIG. 2.

The steps for realizing the eighth step 8 of FIG. 2 are listed in FIG. 6. The first step 61 is determining whether or not the large display option was chosen.

If the large display option was chosen then the second step 62 is opening the X resource dialog files residing in $FMHOME/fminit/usenglish/xresources_ck using X Window Large Display Resources. If another language is desired then the file for the desired language is used in place of the file "usenglish."

If the large display option was not chosen then the third step 63 is opening the x resource dialog files residing in $FMHOME/fminit/usenglish/xresources using default X Window Resources.

Figure 7:
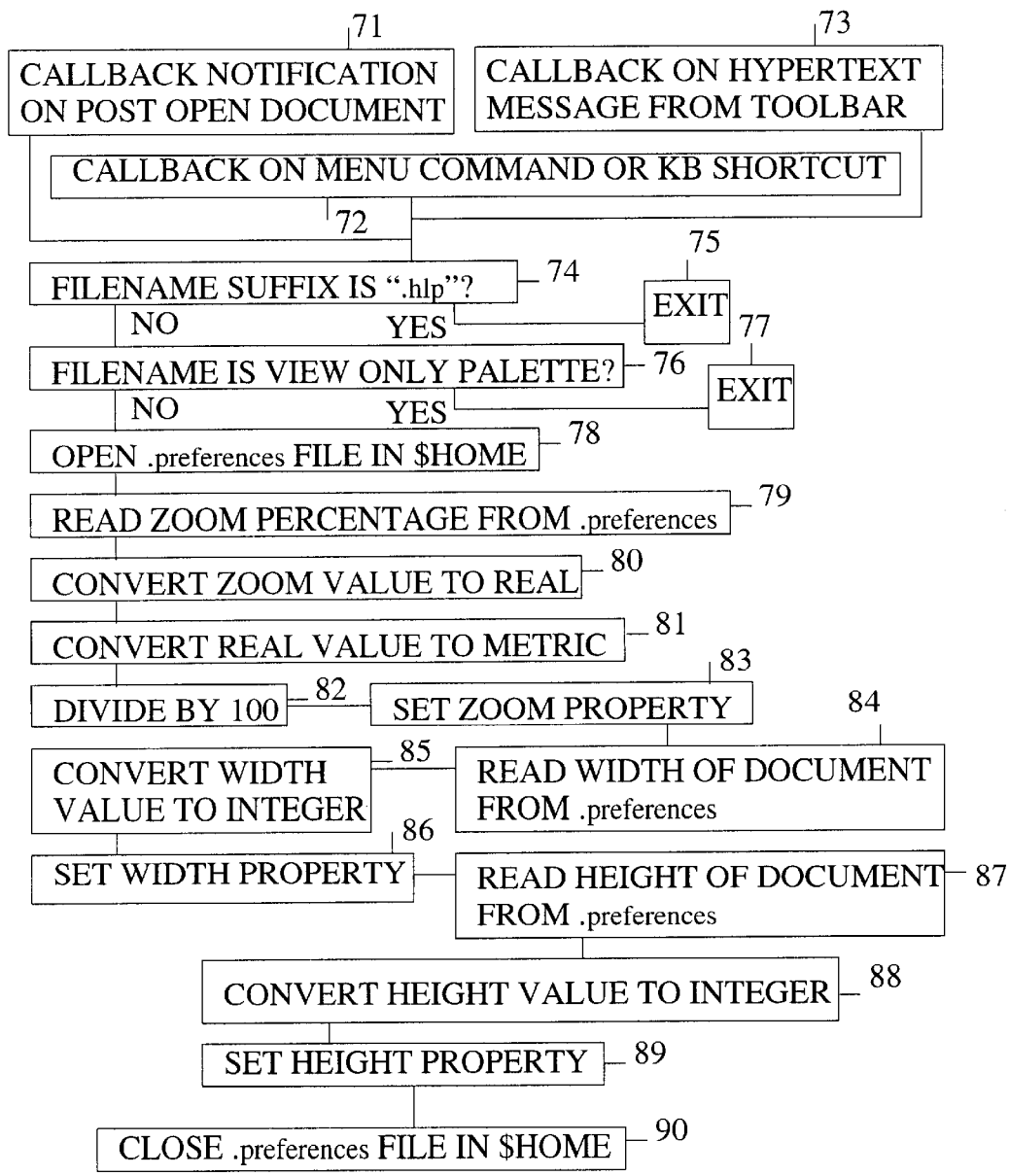
FIG. 7 is a flow-chart for establishing a user's personal preferences.

FIG. 7 lists the steps for establishing the user's personal preferences when using FrameMaker®. The first step 71 is determining if a callback notification was received upon the opening of a document.

The second step 72 is determining if a callback notification was received upon either a menu command or a keyboard (KB) shortcut command.

The third step 73 is determining if a callback notification was received upon a hypertext message from the Toolbar.

If it is determined that a callback notification was received in either the first step 71, the second step 72, or the third step 73 then the fourth step 74 is determining whether or not the suffix of the filename is ".hlp."

If it is determined in the fourth step 74 that the suffix filename is ".hlp" then the fifth step 75 is exiting.

If it is determined in the fourth step 74 that the suffix file name is not ".hlp" then the sixth step 76 is determining if the file is a view only palette.

If it is determined in the sixth step 76 that the file is a view only palette then the seventh step 77 is exiting.

If it is determined in the sixth step 76 that the file is not a view only palette then the eighth step 78 is opening the file ".preferences" in the $HOME directory.

If the eighth step 78 was performed then the ninth step 79 is reading the zoom percentages from ".preferences."

If the ninth step 79 was performed then the tenth step 80 is converting the zoom value to a real number.

If the tenth step 80 is performed then the eleventh step 81 is converting the real number to a metric number.

If the eleventh step 81 is performed then the twelfth step 82 is dividing the metric number by 100.

If the twelfth step 82 is performed then the thirteenth step 83 is setting the zoom property to the result of the twelfth step 82.

If the thirteenth step 83 is performed then the fourteenth step 84 is reading the width of the document being worked on by the user from ".preferences."

If the fourteenth step 84 was performed then the fifteenth step 85 is converting the width value to an integer value.

If the fifteenth step 85 was performed then the sixteenth step 86 is setting the width property to the result of the fifteenth step 85.

If the sixteenth step 86 was performed then the seventeenth step 87 is reading the height of the document being worked on by the user from ".preferences."

If the seventeenth step 87 was performed then the eighteenth step 88 is converting the height value to an integer value.

If the eighteenth step 88 was performed then the nineteenth step 89 is setting the height property to the result of the eighteenth step 88.

If the nineteenth step 89 was performed then the twentieth, and last, step 90 is closing the "preferences" file in the $HOME directory.

What is claimed is:
What is claimed is:

1. A method of enhancing the readability of—FrameMaker—desktop publishing method for a visually-impaired user, is comprised of the steps of:
   a) determining whether or not a file named ".maker. large" exists in the user's $HOME directory;
   b) if ".maker.large" exists in the user's $HOME directory then setting an environmental variable $FZRIDER to a pathname $FMHOME/fdk/NSAapps.large of a directory containing enlarged EASYRIDER API client files;
   c) it"'. maker. large" is not in the user's $HOME directory then setting the environmental variable $EZRIDER to the patbname $FMHOME/fdkINSAa.pps of a directory containing unenlarged EASYRIIDER client files;
   d) if step (b) was performed then setting X Window Large Display Resources to RESOURCE MANAGER property of a root window of screen 0;
   e) determining whether or not an X resource "Maker.api.preferences.autoApply" is set to true in $HOME/.Xdefaults;
   f) if "Maker.api.preferences.autoApply" is set to true then turning on a notification for —FrameMaker—the desktop publishing method to contact the user's Personal Preferences client;
   g) initializing each EASYRIDER API client; and
   h) initializing—FrameMaker—the desktop publishing method product dialogs.

2. The method of claim 1, wherein said step of setting X Window Large Display Resources to RESOURCE_MANAGER property of a root window of screen 0 is comprised of the steps of:
   a) setting the resources for the main product window to a button font to 25 point Helvetica bold, a width of 412 pixels, and a height of 84 pixels;
   b) setting the font resources for the document window status bar and menu bar to a font of 17 point Helvetica bold;
   c) setting the font resources for the document window pop-up menus to a font of 24 point Helvetica bold;
   d) setting the color resources for the document window so that the foreground and the background are complementary colors;
   e) setting the color resources of the document window scroll bars so that the background and the trough are complementary colors;
   f) setting the resource to make it easier to read colored text that is highlighted by setting slow highlighting to true;
   g) setting the font resource for the dialog boxes for scroll list items to 17 point Helvetica bold and all other items to 17 point Helvetica bold;
   h) setting the resources to make it easier to distinguish the "ON" setting from the "OFF" setting by selecting the color red for the "ON" setting;
   i) setting the color resources to make it easier to distinguish the "OFF" setting from the "AS IS" setting by making the top shadow and the bottom shadow complementary colors;
   j) setting the color resources in the main product window, the menus, the dialogs, and the document window scroll bars so that the foreground and the background are complementary colors;
   k) setting the resources for the Character Catalog and the Paragraph Catalog to a font of 20 point Helvetica bold, a width of 272 pixels, and a height of 336 pixels;
   l) setting the resources for the Book window to a font of 24 point Helvetica bold, a width of 600 pixels, and a height of 450 pixels;
   m) setting resources for the cursors to a textline of "textline_large", an arrow of "left_ptr_large", a reshape of "crosshair_large", a dialog of "left_ptr_large", an ibeam of "xterm_large", an ibeaml of "IbeamLeft_large", an ibeamr of "IbeamRight_large", an ibeam90 of "Ibeam90_large", a move of "move_large", a rotate of "rotobject_large", a doreshape of "draft_large", a crosshair of "crosshair_large", and a cellresize of "right_large";
   n) setting the resources for using alternate dialogs to a directory suffix of "_ck" and a name prefix of "fmck_";
   o) setting size resources for the Large Tools window by setting the minimum and maximum height to 441 pixels and the minimum and maximum width to 430 pixels;
   p) setting the size resource for the Small Tool palette to a minimum height of 72 pixels;
   q) setting general resources for all file browsers in the dialog windows to a height and width of 200 pixels, a margin height and width of 0 pixels, and the top attachment, bottom attachment, left attachment, and right attachment to "XmATTACH_FORM";
   r) setting the textbox resources for all file browsers in the dialog windows to an x and y of 0 pixels and a width of 294 pixels;
   s) setting the scrolllist resources for all of the file browsers in the dialog windows to an x of 2 pixels, a y of 30 pixels, a visible item count of 8, a width of 172 pixels, a bottom offset of 42 pixels, a top offset of 32 pixels, and a top attachment and a bottom attachment of "XmATTACH_FORM";
   t) setting the resources for the current directory for all of the file browsers in the dialog windows to an x of 0 pixels, a y of 158 pixels, a recompute size of false, a height of 20 pixels, a width of 192 pixels, a bottom offset of 20 pixels, and a left attachment, a right attachment, and a bottom attachment of "XmATTACH_FORM"; and
   u) setting the resources of the file count for all of the file browsers in the dialog windows to an x of 0 pixels, a y of 174 pixels, a recompute size of false, a height of 19 pixels, a width of 192 pixels, and a bottom attachment of "XmATTACH_FORM."

3. The method of claim 2, wherein said step of initializing each EASYRIDER API client file is comprised of the steps of:
   a) determining whether or not the user uses resource files;
   b) if the user uses resource files then setting the environmental variable $FAPIDIR to $EZRIDER, where $EZRIDER is the current client's directory of normal sized or enlarged files, running the client executables, and opening the dialog resource files and button palettes residing in $FAPIDIR; and
   c) if the user is not using resource files then setting the environmental variable $FAPIDIR to $FMHOME/fdkNSAapps, and running the client executables.

4. The method of claim 3, wherein said step of initializing —FrameMaker—the desktop publishing method product dialogs is comprised of the steps of:
   a) determining whether or not a large display option was chosen;

b) if the large display option was chosen then opening x resource dialog files in $FMI-TOME/fminit/usenglish/xresources_ck using X Window Large Display Resources;

c) if the large display option was not chosen then opening x resource dialog files residing in $FMHOME/fminit/usenglish/xresources using default X Window Resources.

5. The method of claim 4, further comprising the steps of:

a) determining if a callback notification was received upon opening a document;

b) determining if a callback notification was received upon occurrence of one event selected from the group of events consisting of a menu command and a keyboard shortcut command;

c) determining if a callback notification was received upon a hypertext message from a Toolbar;

d) if it is determined that a callback notification was received then determining if a suffix of a file is ".hlp";

e) if the suffix of the file is ".hlp" then exiting;

f) if the suffix of the file is not ".hlp" then determining if the file is a view only palette;

g) if the file is view only palette then exiting;

h) if the file is not view only palette then opening a file ".preferences" in the user's $HOME directory;

i) reading a zoom-percentage value from ".preferences";

j) converting the zoom-percentage value to a real number;

k) converting the real number to a metric number;

l) dividing the metric number by 100;

m) setting a zoom property to the result of the last step;

n) reading a width value of the document being worked on by the user from ".preferences";

o) converting the width value to an integer value;

p) setting a width property to the result of the last step;

q) reading a height value of the document being worked on by the user from ".preferences";

r) converting the height value to an integer value;

s) setting a height property to the result of the last step; and t) closing the ".preferences" file in the user's $HOME directory.

6. The method of claim 1, wherein said step of initializing each EASYRIDER API client file is comprised of the steps of:

a) determining if the user uses resource files;

b) if the user uses resource files then setting the environmental variable $FAPIDIR to $EZRIDER, where $EZRIDER is the current client's directory of normal sized or enlarged files, running the client executables, and opening the dialog resource files and button palettes residing in $FAPIDIR; and c) if the user is not using resource files then setting the environmental variable $FAPIDIR to $FMHOME/fdk/NSAapps, and running the client executables.

7. The method of claim 1, wherein said step of initializing —FrameMaker—the desktop publishing method product dialogs is comprised of the steps of:

a) determining whether or not a large display option was chosen;

b) if the large display option was chosen then opening x resource dialog files in $FMHOMF/flninit/usenglish/xresources ck using X Window Large Display Resources;

c) if the large display option was not chosen then opening x resource dialog files residing in $FMHOMF/flninit/usenglish/xresources using default X Window Resources.

8. The method of claim 1, further comprising the steps of:

a) determining if a callback notification was received upon opening a document;

b) determining if a callback notification was received upon occurrence of one event selected from the group of events consisting of a menu command and a keyboard shortcut command;

c) determining if a callback notification was received upon a hypertext message from a Toolbar;

d) if it is determined that a callback notification was received then determining if a suffix of a file is ".hlp";

e) if the suffix of the file is ".hlp" then exiting;

f) if the suffix of the file is not ".hlp" then determining if the file is a view only palette;

g) if the file is view only palette then exiting;

h) if the file is not view only palette then opening a file ".preferences" in the user's $HOME directory;

i) reading zoom-percentage value from ".preferences";

j) converting the zoom-percentage value to a real number;

k) converting the real number to a metric number;

l) dividing the metric number by 100;

m) setting a zoom property to the result of the last step;

n) reading a width value of the document being worked on by the user from ".preferences";

o) converting the width value to an integer value;

p) setting a width property to the result of the last step;

q) reading a height value of the document being worked on by the user from ".preferences";

r) converting the height value to an integer value;

s) setting a height property to the result of the last step; and t) closing the ".preferences" file in the user's $HOME directory.

* * * * *